United States Patent
Dominguez et al.

(10) Patent No.: US 9,486,884 B2
(45) Date of Patent: *Nov. 8, 2016

(54) EXCESS FLOW VALVE WITH FLEXIBLE SEALING MEMBER

(71) Applicant: BrassCraft Manufacturing Company, Novi, MI (US)

(72) Inventors: Jesus R. Dominguez, Plymouth, MI (US); Joseph P. Schutte, Westland, MI (US); David C. Tisch, Ferndale, MI (US); Ronald D. Green, New Hudson, MI (US); Timothy D. Mulligan, Saline, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/561,255

(22) Filed: Dec. 5, 2014

(65) Prior Publication Data

US 2015/0219231 A1 Aug. 6, 2015

Related U.S. Application Data

(63) Continuation-in-part of application No. 14/169,178, filed on Jan. 31, 2014, now abandoned.

(51) Int. Cl.
| | |
|---|---|
| *F16K 15/00* | (2006.01) |
| *B23P 15/00* | (2006.01) |
| *F16K 17/20* | (2006.01) |
| *F16K 17/28* | (2006.01) |

(52) U.S. Cl.
CPC ............ *B23P 15/001* (2013.01); *F16K 17/205* (2013.01); *F16K 17/28* (2013.01); *Y10T 137/0324* (2015.04); *Y10T 137/0497* (2015.04); *Y10T 137/7785* (2015.04); *Y10T 137/7866* (2015.04); *Y10T 137/7869* (2015.04); *Y10T 137/7879* (2015.04)

(58) Field of Classification Search
CPC ........ F16K 15/144; F16K 7/17; F16K 7/126; Y10T 137/7866; Y10T 137/7869; Y10T 137/7879; Y10T 137/7895
See application file for complete search history.

(56) References Cited

U.S. PATENT DOCUMENTS

| | | | | |
|---|---|---|---|---|
| 162,598 | A * | 4/1875 | Bailey | F16K 15/148 137/512.15 |
| 530,442 | A * | 12/1894 | Munger | F16K 17/30 137/517 |
| 2,777,464 | A * | 1/1957 | Mosely | D06F 9/088 137/516.13 |
| 2,948,296 | A * | 8/1960 | Thorburn | F16K 17/34 137/517 |
| 4,129,144 | A | 12/1978 | Anderson | |

(Continued)

OTHER PUBLICATIONS

International Search Report and Written Opinion for PCT Application No. PCT/US2014/039881, mailed Oct. 23, 2014.

(Continued)

*Primary Examiner* — R. K. Arundale
(74) *Attorney, Agent, or Firm* — Carlson, Gaskey & Olds, PC (57) ABSTRACT

An assembly for limiting excess flow includes a seat that provides a sealing surface and a diaphragm that is coupled to the seat. The diaphragm includes a seal portion and at least one leg extending between the seal portion and the seat. The seal portion is spaced apart from the sealing surface during normal flow conditions and is in engagement with the sealing surface when a predetermined flow condition is exceeded.

22 Claims, 11 Drawing Sheets

(56) References Cited

U.S. PATENT DOCUMENTS

| | | | |
|---|---|---|---|
| 5,293,898 A * | 3/1994 | Masloff | F16K 17/30 137/498 |
| 8,256,465 B2 | 9/2012 | Christenson et al. | |
| 8,640,733 B1 * | 2/2014 | Lenn | F16K 17/28 137/517 |
| 2004/0007601 A1 | 1/2004 | Masuda | |
| 2004/0079911 A1 | 4/2004 | Glover et al. | |
| 2004/0250864 A1 | 12/2004 | Zelson | |
| 2007/0251592 A1 | 11/2007 | Christenson et al. | |
| 2013/0160875 A1 | 6/2013 | Schriner | |
| 2014/0097374 A1 * | 4/2014 | Moon | F16K 17/28 251/359 |

OTHER PUBLICATIONS

International Search Report and Written Opinion for International Application No. PCT/US2015/058231 mailed Feb. 1, 2016.

* cited by examiner

EXCESS FLOW VALVE WITH FLEXIBLE SEALING MEMBER

RELATED APPLICATION

This application is a continuation-in-part application of U.S. patent application Ser. No. 14/169,178, filed Jan. 31, 2014.

BACKGROUND OF THE INVENTION

The present invention generally relates to an excess flow valve that permits fluid flow through a flow line if the flow is below a predetermined flow rate but minimizes the flow if the flow rate rises above the predetermined limit to prevent uncontrolled flow or discharge of fluids.

Excess flow valves are typically used in a capsule to facilitate its installation in various flow lines, fittings, pipe systems, appliances and the like. The excess flow valve acts in response to a high or a low differential pressure between the upstream pressure and downstream pressure of the capsule. In one known configuration, the excess flow valve capsule is comprised of four components including a housing, a seat, a valve plate or body, and a spring or magnet to bias the valve plate. The capsule may be inserted in various flow passageways including a valve body, a connector fitting, a hose fitting, a pipe nipple, a tube, a male iron pipe (MIP), a female iron pipe (FIP), an appliance and other similar installations to provide excess flow protection.

These spring and magnet configurations can be disadvantageous from a cost and assembly perspective due to the number of components. The magnet is especially costly and difficult to procure. Further, the magnet poses constraints on the design of the capsule and excess flow valve that make it difficult to lower cost and provide improvements.

SUMMARY OF THE INVENTION

According to one exemplary embodiment, an assembly for limiting excess flow includes a seat that provides a sealing surface and a diaphragm that is coupled to the seat. The diaphragm includes a seal portion and at least one leg extending between the seal portion and the seat. The seal portion is spaced apart from the sealing surface during normal flow conditions and is in engagement with the sealing surface when a predetermined flow condition is exceeded.

In another embodiment according to the previous embodiment, the at least one leg comprises a plurality of legs that are circumferentially spaced apart from each other.

In another embodiment according to any of the previous embodiments, the legs are moveable between a first position during normal flow conditions and the legs are collapsed to a second position when the predetermined flow condition is exceeded.

In another embodiment according to any of the previous embodiments, the seal portion comprises a solid body having an upstream side and a downstream side, and wherein each leg has a first end attached to the downstream side and a second end directly attached to the seat.

In another embodiment according to any of the previous embodiments, the seal portion comprises a solid body having an upstream side and a downstream side, and wherein the diaphragm further includes a ring portion axially spaced from the seal portion, and wherein each leg has a first end attached to the downstream side and a second end attached to the ring portion.

In another embodiment according to any of the previous embodiments, the seat comprises a band having a central bore extending from an upstream end face to a downstream end face, and wherein the sealing surface comprises a tapered surface portion formed along at least a portion of the central bore.

In another embodiment according to any of the previous embodiments, the seat comprises a single-piece structure, and wherein at least a portion of the diaphragm is compressible such that one end of the diaphragm can be inserted into the seat for installation purposes and with the portion rebounding from compression once properly installed to form an assembly configured for receipt within a fitting.

In another embodiment according to any of the previous embodiments, the seat comprises first and second pieces that are fitted together around the ring portion to form an assembly configured for receipt within a fitting.

In another embodiment according to any of the previous embodiments, one of the first and second pieces includes at least one female portion and the other of the first and second pieces includes at least one male portion configured to be received within the at least one female portion to secure the first and second pieces together.

According to another exemplary embodiment, an assembly for limiting excess flow includes a fitting having an internal bore defined by a first diameter, a seat positioned within the internal bore, the seat providing a sealing surface, and a diaphragm coupled to the seat. The diaphragm includes a seal portion and a plurality of legs extending between the seal portion and the seat. The seal portion is spaced apart from the sealing surface during normal flow conditions and is in engagement with the sealing surface when a predetermined flow condition is exceeded.

In another embodiment according to any of the previous embodiments, the seal portion includes an outermost peripheral edge that defines a second diameter that is less than the first diameter. The seat defines an inner opening that includes a tapered surface that forms the sealing surface. During normal flow conditions, fluid flows around the outermost peripheral edge of the seal portion and then through openings formed between the legs and then flows through an open downstream end of the seat. When the predetermined flow condition is exceeded, the plurality of legs collapse and the seal portion engages the tapered surface to prevent flow through the inner opening of the seat.

In another embodiment according to any of the previous embodiments, the fitting comprises a first piece having a first attachment interface and a second piece having a second attachment interface that cooperates with the first attachment interface to selectively connect the first and second pieces together to surround the seat and diaphragm.

In another embodiment according to any of the previous embodiments, the seal portion comprises a cup-shape having an upstream side comprising a concave surface against which flow pressure is exerted, and wherein the legs are curved in a radially inwardly direction during normal flow conditions.

In another embodiment according to any of the previous embodiments, the seal portion comprises a solid body having an upstream side and a downstream side, and wherein the diaphragm further includes a ring portion axially spaced from the seal portion, and wherein each leg has a first end attached to the downstream side and a second end attached to the ring portion.

In another embodiment according to any of the previous embodiments, the seat comprises a band held fixed within the fitting and having a central bore extending from an upstream end face to a downstream end face, and wherein the sealing surface comprises a tapered surface portion formed along at least a portion of the central bore.

In another embodiment according to any of the previous embodiments, the seat comprises a single-piece structure that includes a recess formed within the downstream end face to receive the ring portion.

In another embodiment according to any of the previous embodiments, the seat comprises first and second pieces that are fitted together around the ring portion to securely couple the diaphragm and seat together.

In another embodiment according to any of the previous embodiments, one of the first and second pieces includes at least one female portion and the other of the first and second pieces includes at least one male portion configured to be received within the at least one female portion to secure the first and second pieces together.

According to another exemplary embodiment, a method of forming an excess flow valve includes the steps of forming first and second fitting pieces, connecting the first and second fitting pieces together to define an internal bore, coupling a diaphragm having a seal portion to a seat with a plurality of legs such that the seal portion is moveable relative to the seat, and fixing the seat within the internal bore.

In another embodiment according to any of the previous embodiments, additional steps include forming the diaphragm to include a ring portion that is coupled to the seal portion via the plurality of legs, and forming the seat as a band that is fit within the internal bore and which surrounds the ring portion.

These and other features of the present invention can be best understood from the following specification and drawings, the following of which is a brief description.

DETAILED DESCRIPTION

Figure 1:
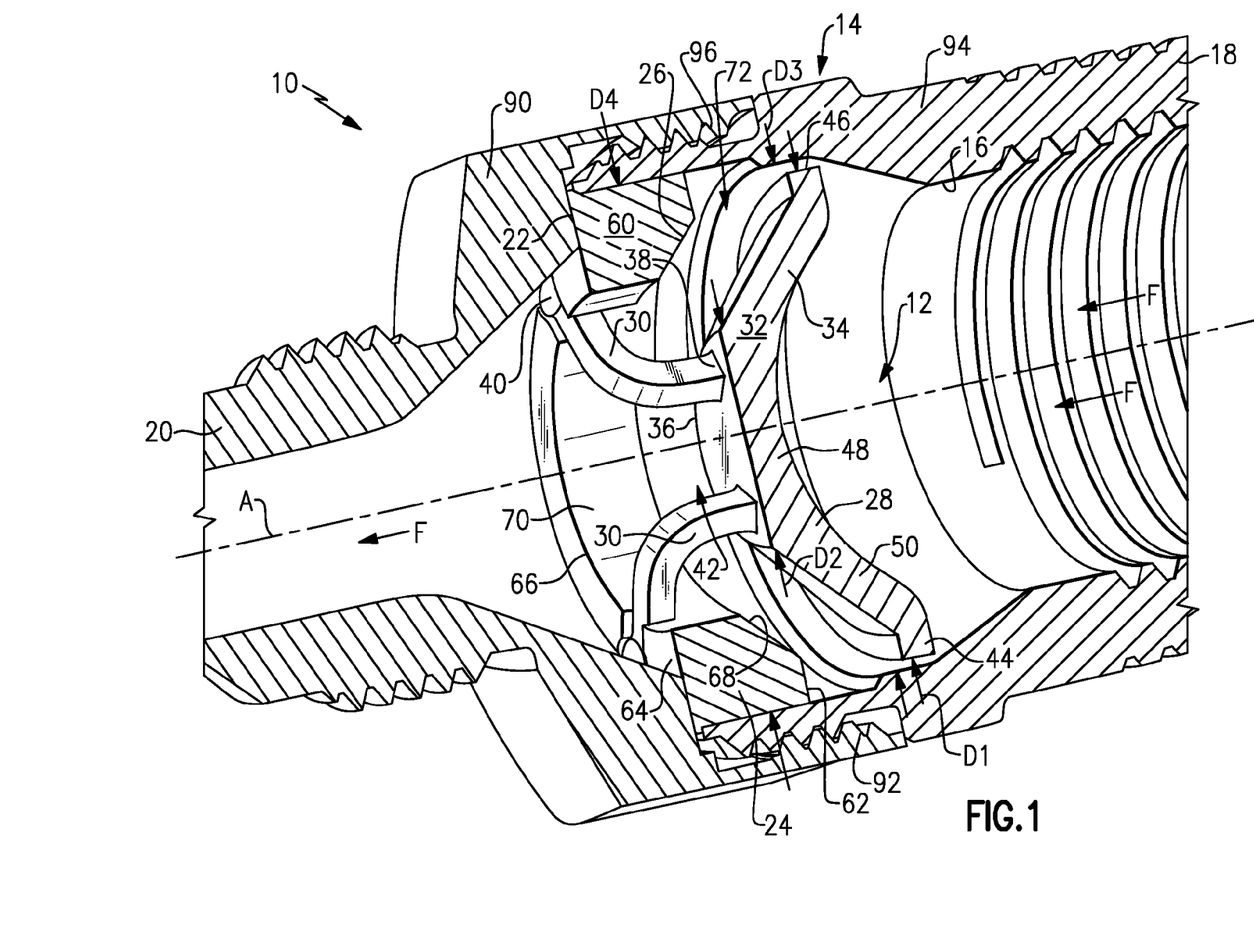
FIG. 1 shows a cross-section view of an excess flow valve in a fitting when in an open position.

FIG. 1 shows a fitting 10 and an excess flow valve 12. The fitting 10 can carry different fluids, such as natural gas, or other gases or liquids for example. In one example configuration, the fitting 10 is configured to couple a fluid supply line to an appliance (not shown).

The fitting 10 includes a housing 14 having an internal bore 16 defining a central axis A and extending from an upstream end 18 to a downstream end 20. The bore 16 provides a shoulder 22 within the internal bore 16. A seat 24 is held fixed within the internal bore 16 and provides a sealing surface 26. A diaphragm 28 is coupled to the seat 24 by one or more legs 30. The diaphragm 28 is spaced apart from the sealing surface 26 during normal flow conditions and is in engagement with the sealing surface 26 when a predetermined flow condition is exceeded. This will be discussed in greater detail below.

The diaphragm 28 comprises a solid body 32 having an upstream side 34 and a downstream side 36. The legs 30 have a first end 38 attached to the downstream side 36 and a second end 40 attached to the seat 24. The legs 30 are circumferentially spaced apart from each other about the central axis A. Gaps or openings 42 are formed between adjacent legs 30. The legs 30 are moveable between a first position (FIG. 1) during normal flow conditions and are collapsed to a second position (FIG. 2) when the predetermined flow condition is exceeded.

Figure 2:
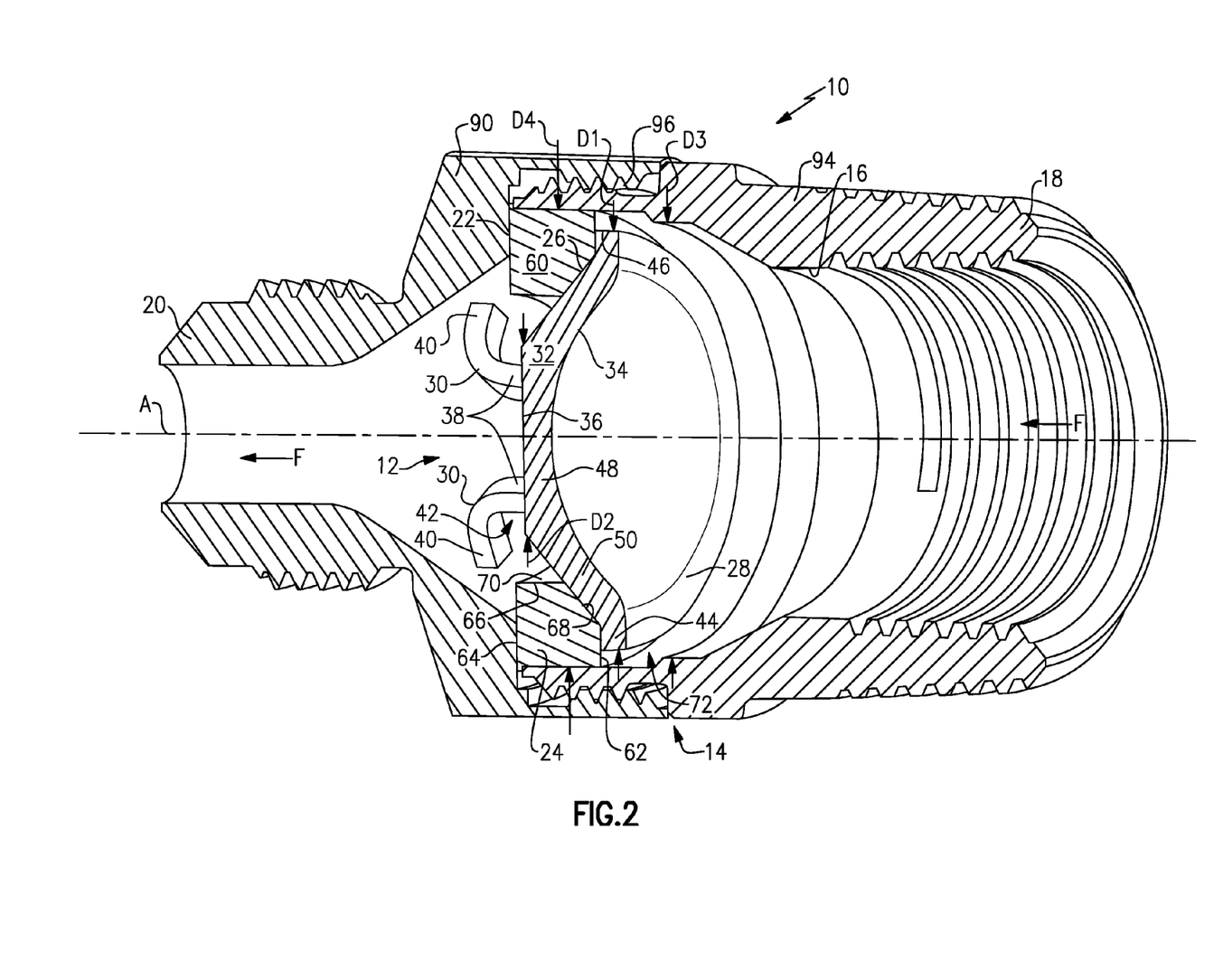
FIG. 2 shows the excess flow valve of FIG. 1 in a closed position.

The solid body 32 comprises a shuttle portion of the excess flow valve 12 that is naturally positioned to allow for flow through the valve 12 during normal flow conditions. When a certain flow pressure is reached, i.e. the predetermined flow condition is exceeded, the pressure on the shuttle portion overcomes the resistance of the legs 30 and the shuttle portion will press against the sealing surface 26 of the seat 24 to prevent fluid from being released to the external environment in an excess flow condition. After the pressure is equalized on both sides of the shuttle portion, the resilient force of the legs 30 causes the shuttle portion to return to the original position such that fluid can again flow through the valve 12.

In one example, the solid body 32 comprises a cup-shape with the upstream side 34 comprising a concave surface against which flow pressure F is exerted. The solid body 32 has a lip 44 that extends about the central axis A to form a peripheral edge 46 of the solid body 32. The solid body 32 on the upstream side 34 curves inwardly from the lip 44 to a bottom 48 of the cup-shape. The peripheral edge 46 defines a maximum of an outermost diameter D1 of the solid body 32. The bottom 48 defines a minimum diameter D2 of the solid body 32. The solid body 32 includes a tapered surface portion 50 that extends inwardly from the downstream side of the lip 44 toward the bottom 48 at the minimum diameter.

In one example, the first ends 38 of the legs 30 are attached to a downstream side of the bottom 48 of the solid body 32, and the legs 30 are curved in a radially inwardly direction during normal flow conditions as shown in FIG. 1. The legs 30 are formed from a flexible material such that the legs 30 are capable of holding the solid body 32 away from the seat 24 during normal flow conditions. During an excess flow condition, the resilient upstream biasing force of the legs 30 is overcome and the legs 30 bend further inwardly toward each other to pull the solid body 32 in a downstream direction until the tapered surface portion 50 is in sealing engagement with the sealing surface 26. When pressures eventually equalize on both sides of the solid body 32, the resilient force of the legs 30 allows the legs 30 to push the solid body 32 in an upstream direction and out of engagement with the seat 24.

As shown in FIG. 1, the internal bore 16 defined by a diameter D3 at a portion that is aligned with the lip 44 during normal flow conditions. Diameter D3 is greater than the outermost diameter D1 of the diaphragm 28. The internal bore 16 is defined by another diameter D4 at a downstream location that receives the seat 24. D4 is greater than D3. The shoulder 22 defines an abutment surface against which the seat 24 is held fixed in a press-fit.

In one example, the seat 24 comprises a rigid ring body 60 having an upstream end face 62 and a downstream end face 64. The ring body 60 has an inner opening 66 that is aligned with the internal bore 16. In one example, the inner opening 66 is concentric with the axis A. The downstream end face 64 is seated directly on the shoulder 22 with the sealing surface 26 comprising a tapered surface 68 that extends in a radially inward direction from the upstream end face 62. The lip 44 of the solid body 32 is seated against the upstream end face 62 during an excess flow condition.

The inner opening 66 of the seat 24 defines a surface 70 that extends from a downstream end of the tapered surface 68 to the downstream end face 64. During normal flow conditions fluid flows around the outermost peripheral edge 46 of the lip 44 of the diaphragm 28 and through a gap 72 formed between the seat 24 and the diaphragm 28. The fluid then flows through the openings 42 formed between adjacent legs 30 and through the inner opening 66 of the ring body 60 to exit the downstream end 20 of the housing 14. When the predetermined flow condition is exceeded, such as during an excess flow condition, the diaphragm 28 engages the tapered surface 68 to prevent flow through the inner opening 66 of the ring body 60.

Figure 3:
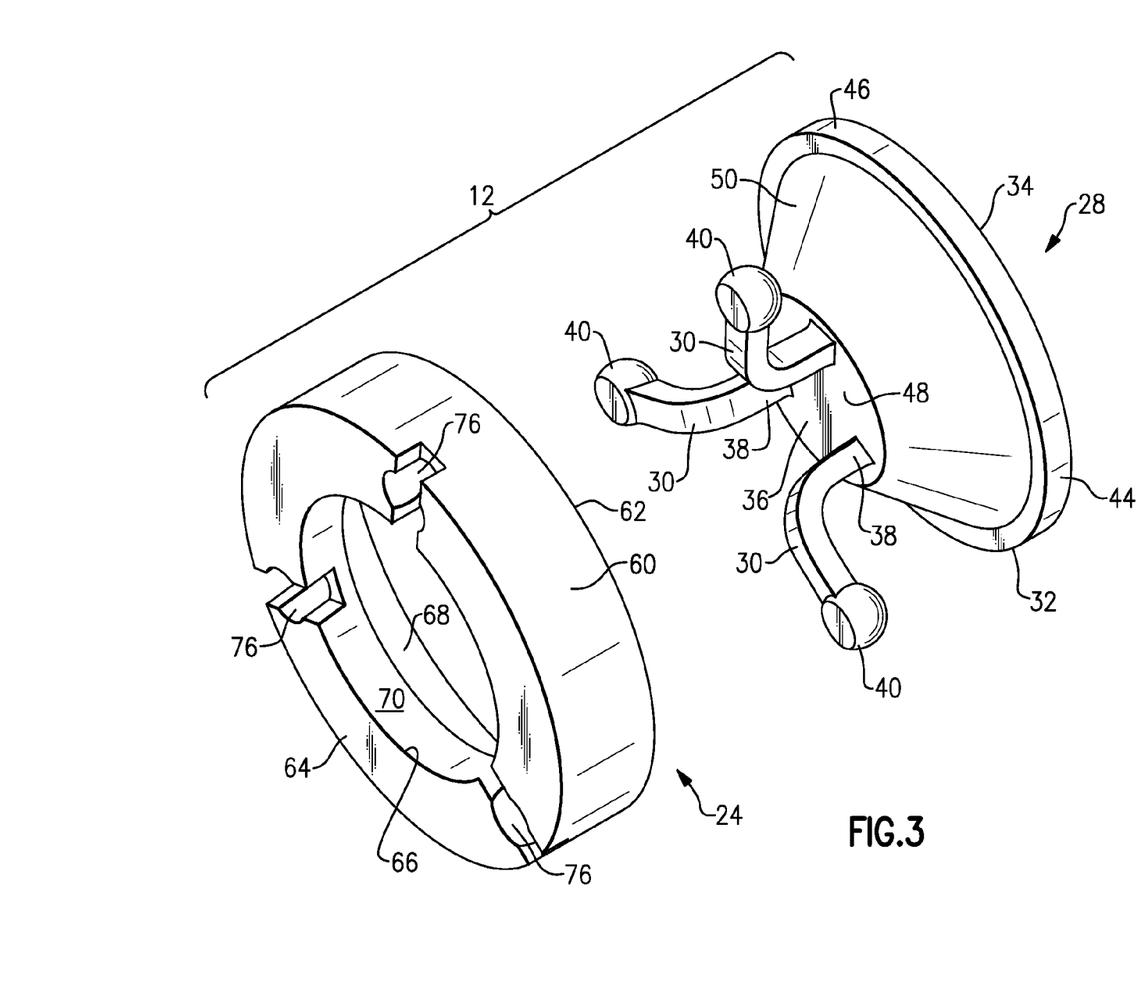
FIG. 3 is an exploded view of the excess flow valve of FIG. 1.
Figure 4:
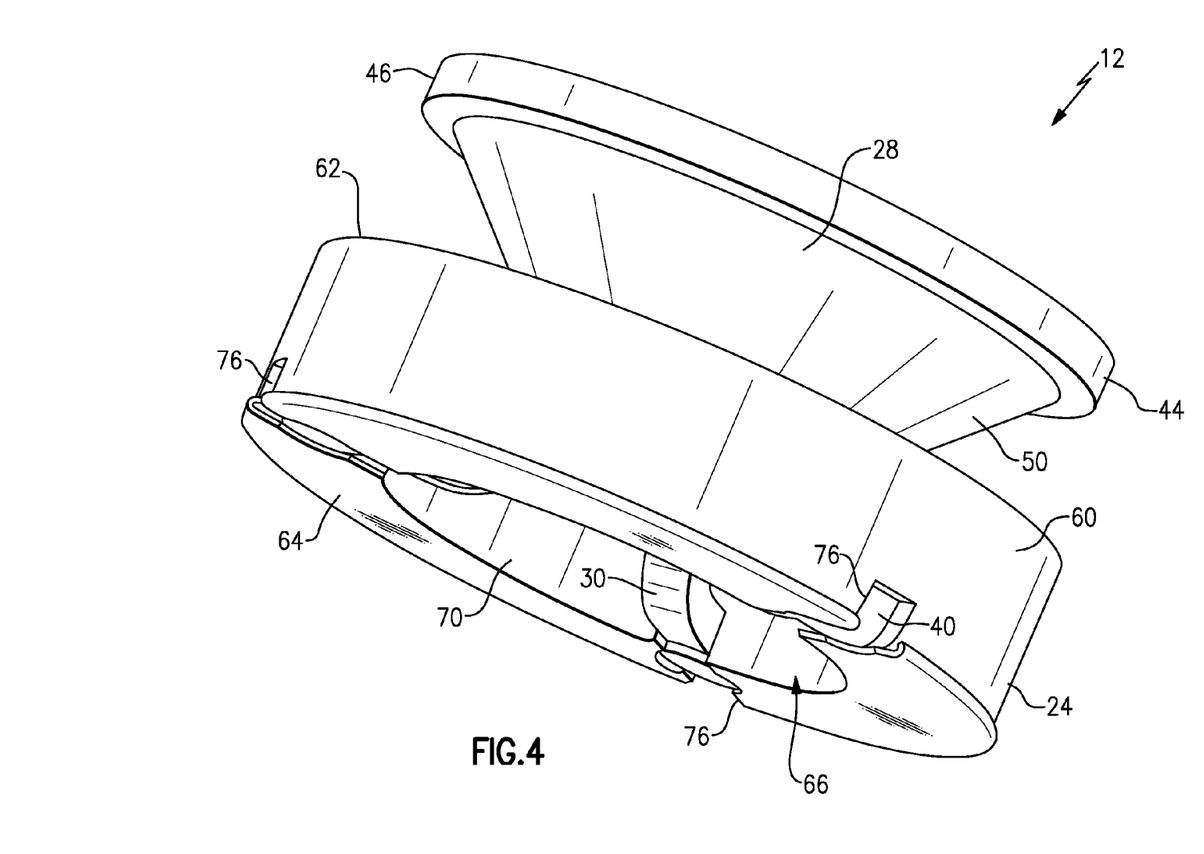
FIG. 4 is a perspective side view of the excess flow valve of FIG. 3 when assembled.
Figure 5:
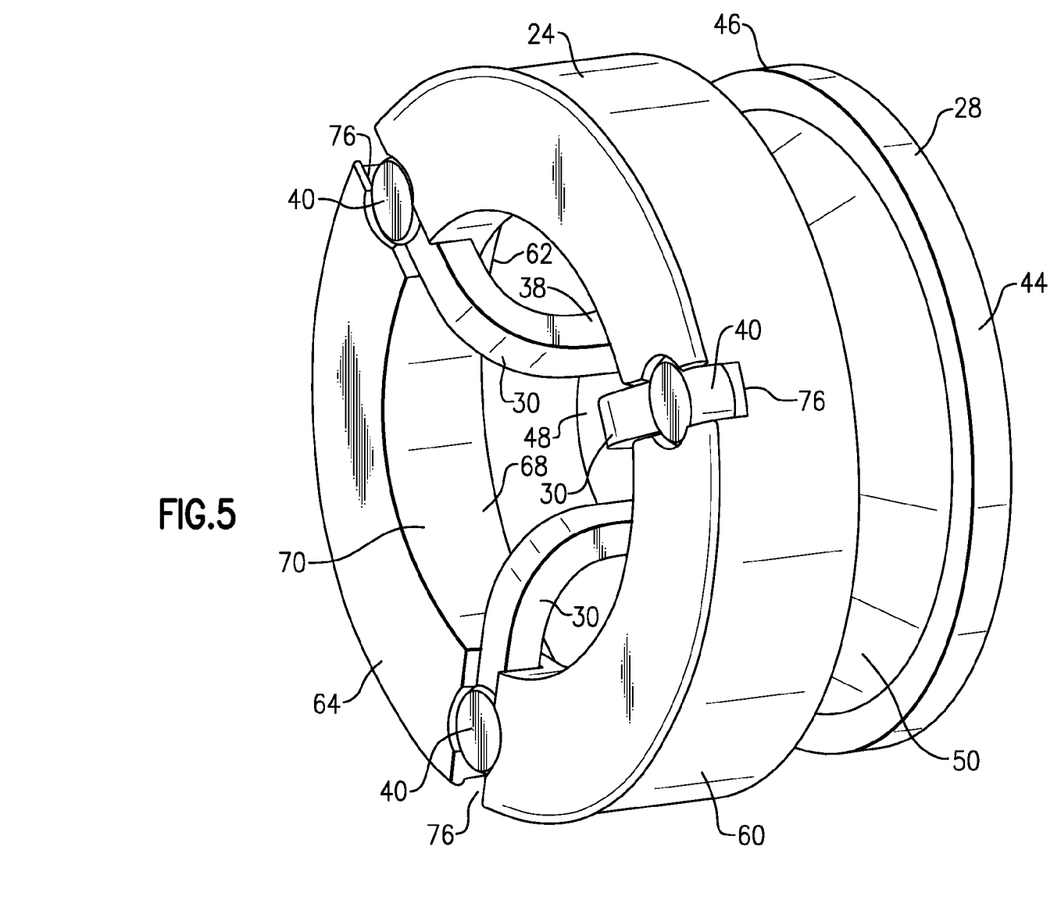
FIG. 5 is an end view of FIG. 4.
Figure 6:
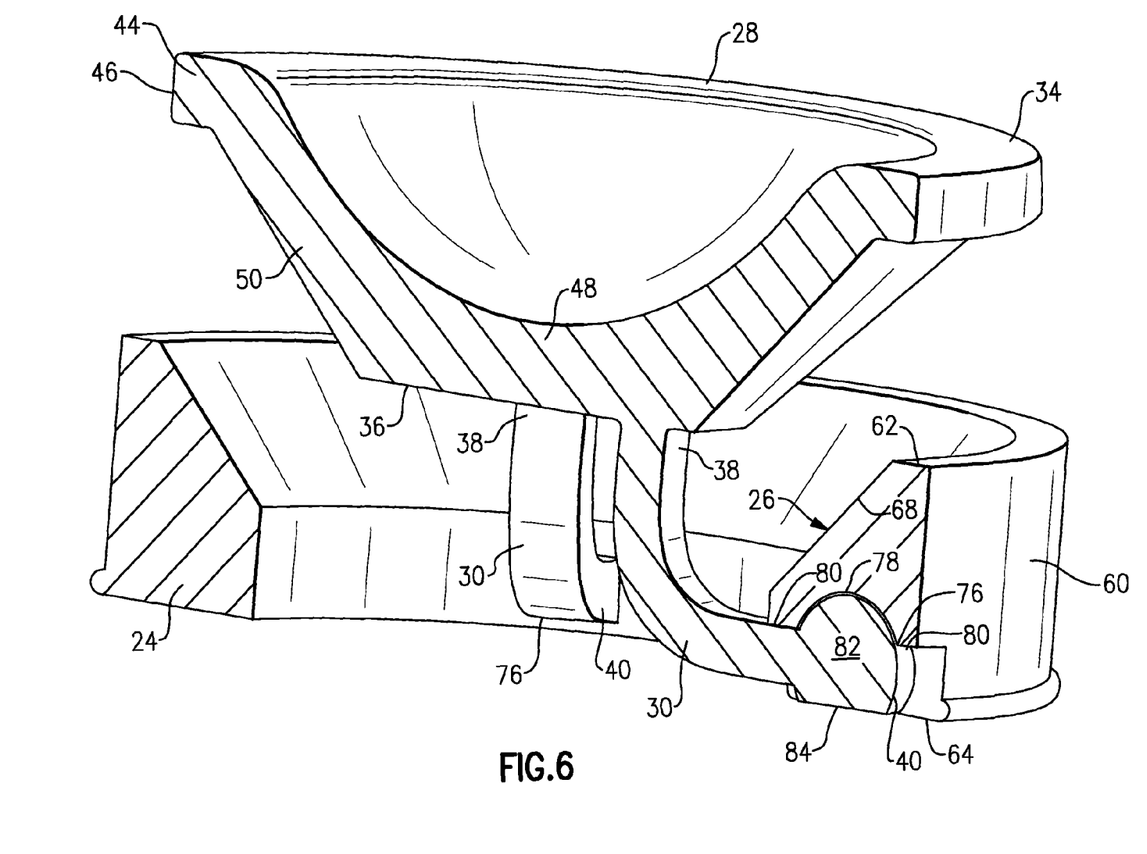
FIG. 6 is a cross-section of the excess flow valve when assembled.

As shown in FIG. 3, the ring body 60 includes a plurality of recesses 76 that form attachment interfaces for the legs 30. As shown in FIGS. 4-6 the second ends 40 of the legs 30 are received within the recesses 76.

Figure 7:
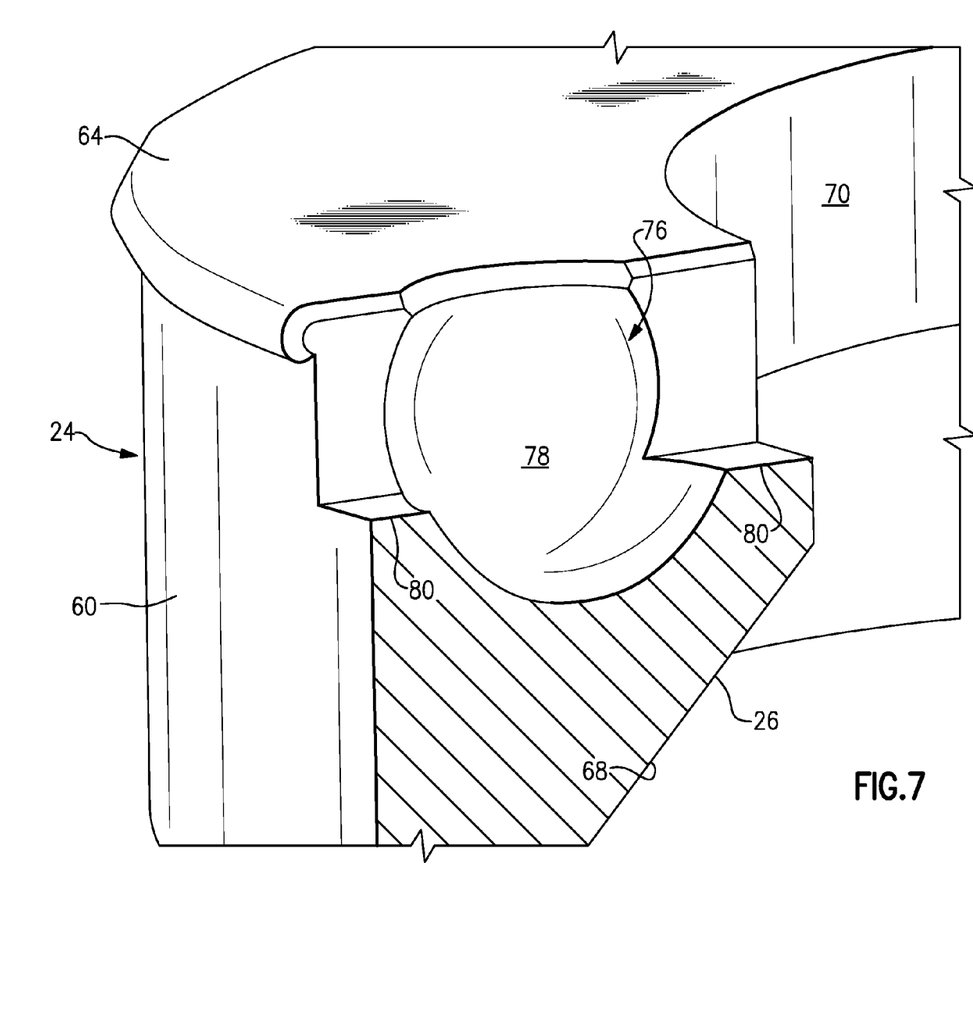
FIG. 7 is a magnified view of a recess that receives a leg of the excess flow valve.
Figure 8:
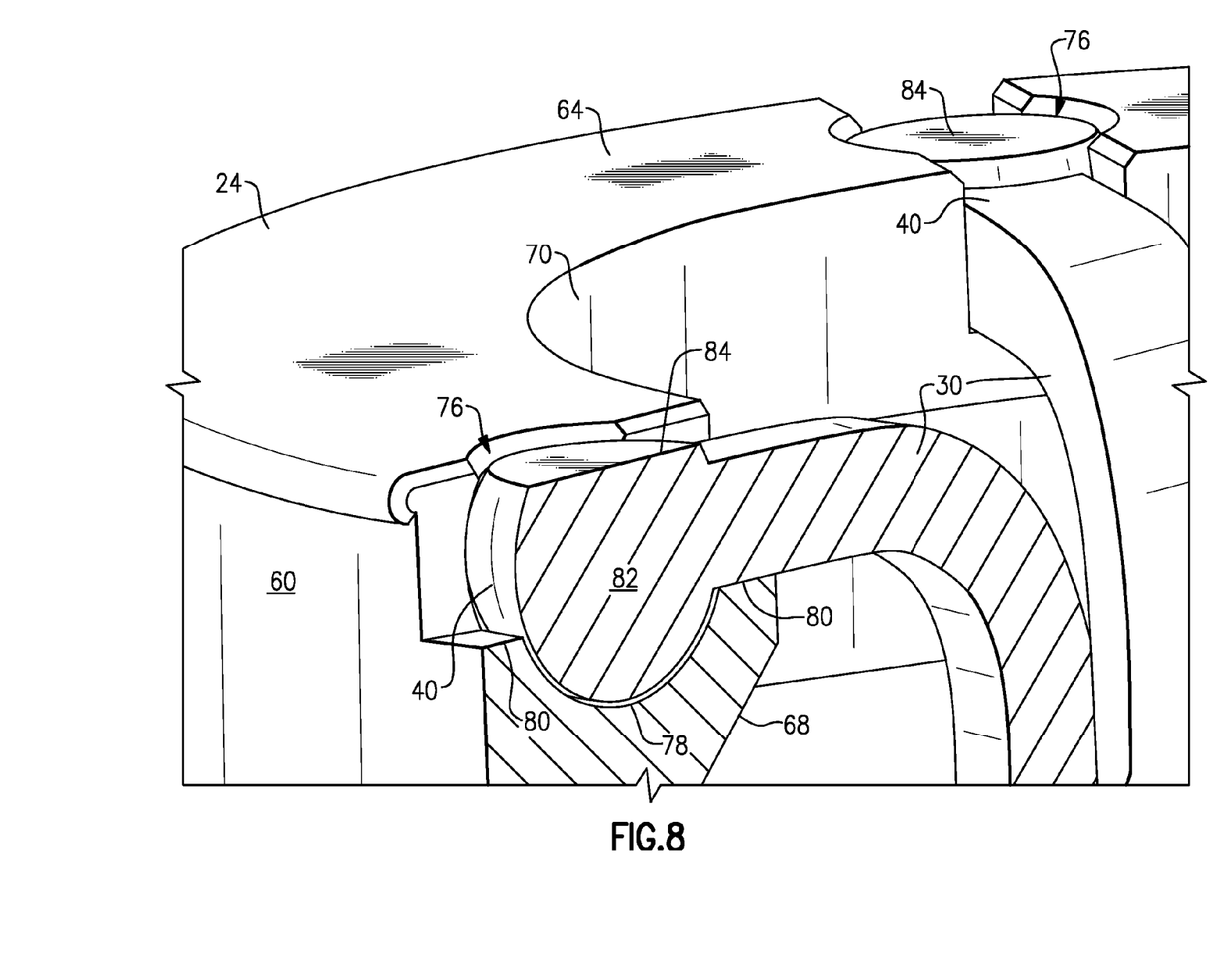
FIG. 8 is a magnified cross-section view of a leg received with the recess.

FIG. 7 shows a magnified view of one of the recesses 76. The recesses 76 are open to the downstream end face 64. Each recess 76 includes a curved surface portion 78 that is positioned between a pair of linear surface portions 80. As shown in FIG. 8, the second end 40 of the leg 30 includes an enlarged bulbous portion 82 that has a greater cross-sectional area than the leg 30. In the example shown, the legs 30 have a square or rectangular shape; however, other cross-sectionals shapes could also be used. When installed, each bulbous portion 82 engages the curved surface portions 78 of the recesses 76. In one example, one side of the bulbous portion 82 is truncated 84 such that the bulbous portion 82 does not extend outwardly of the ring body 60 at the downstream end face 64 to further facilitate flow.

In one example, the housing 14 (see FIGS. 1-2) comprises a first piece 90 having a first attachment interface 92 and a second piece 94 having a second attachment interface 96 that cooperates with the first attachment 92 interface to selectively connect the first 90 and second 94 pieces together. In one example, the first 92 and second 96 attachment interfaces comprise threaded attachment interfaces.

One exemplary method of forming the excess flow valve 12 includes the steps of molding the first 90 and second 94 housing pieces, connecting the first 90 and second 94 housing pieces together to define the internal bore 16, coupling the diaphragm 28 to the seat 24 with one or more legs 30 such that the diaphragm 28 is moveable relative to the seat 24, and fixing the seat 24 within the internal bore 16.

In one example, the method includes the steps of molding the first 90 and second 94 housings from a plastic material and forming the legs 30 from a flexible material.

Figure 9:
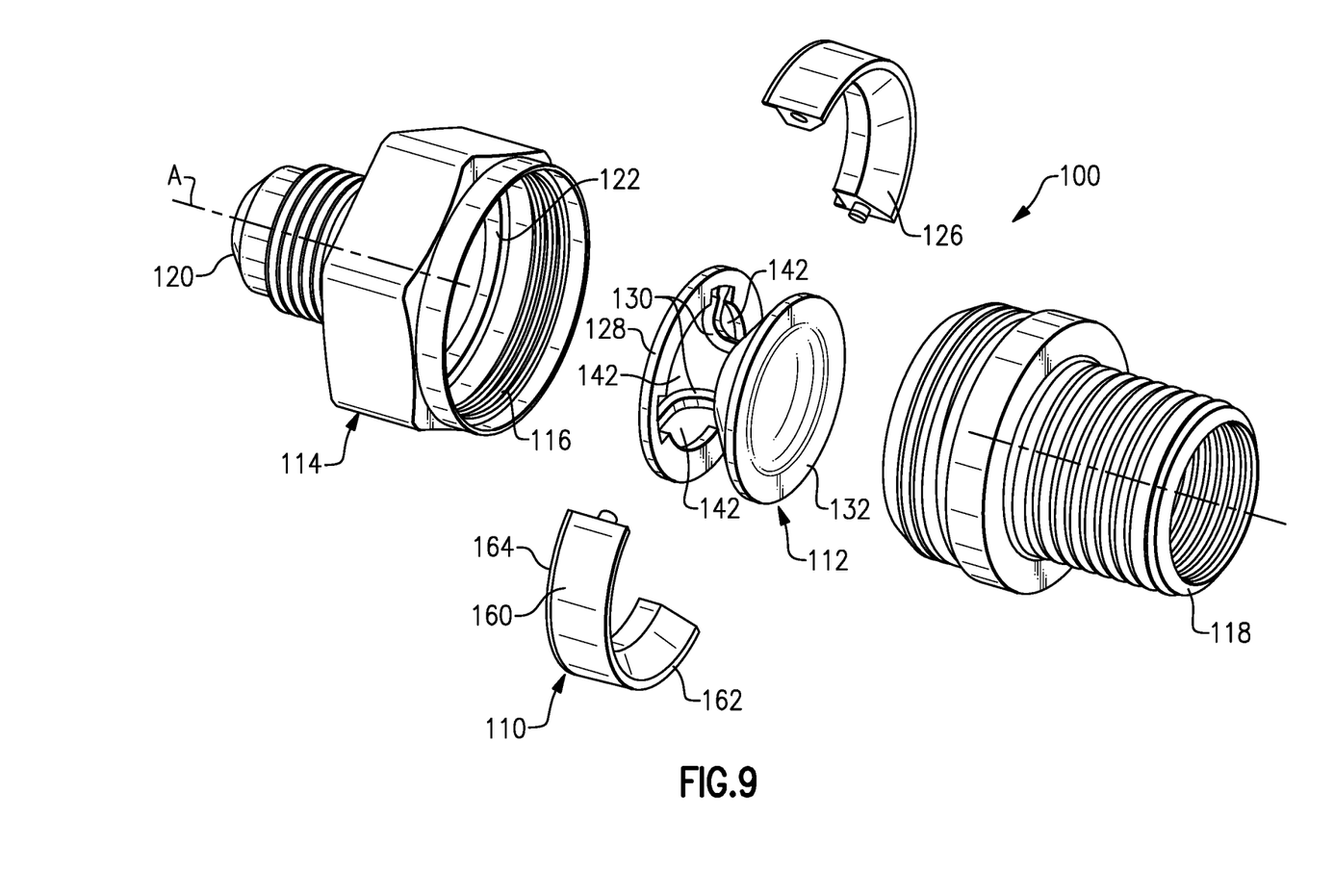
FIG. 9 is an exploded view of another example of an excess flow valve and fitting.
Figure 10:
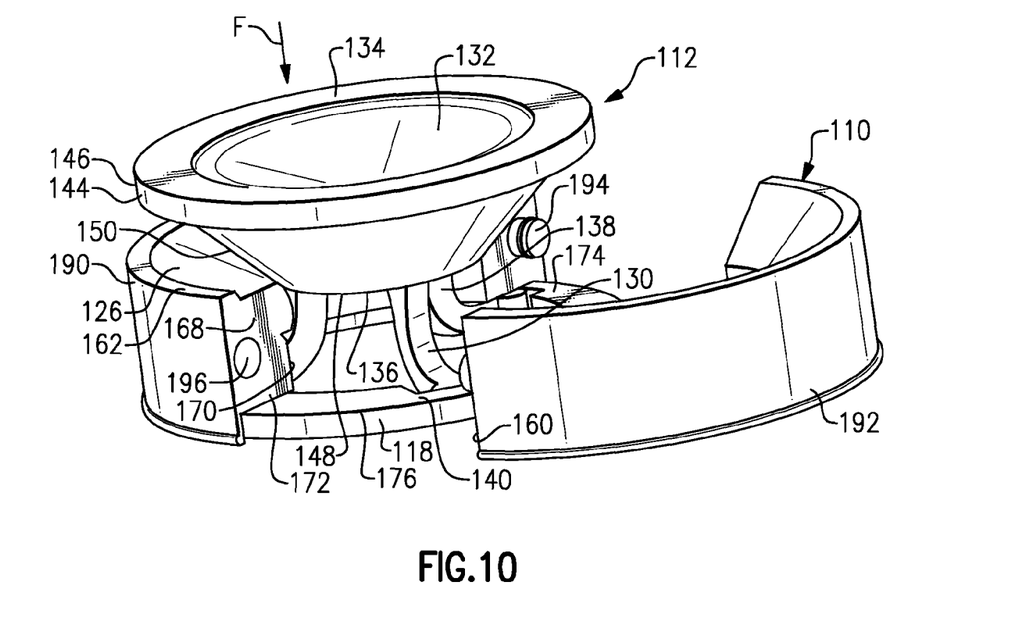
FIG. 10 is a side perspective view showing a two piece seat and diaphragm from the valve of FIG. 9.
Figure 11:
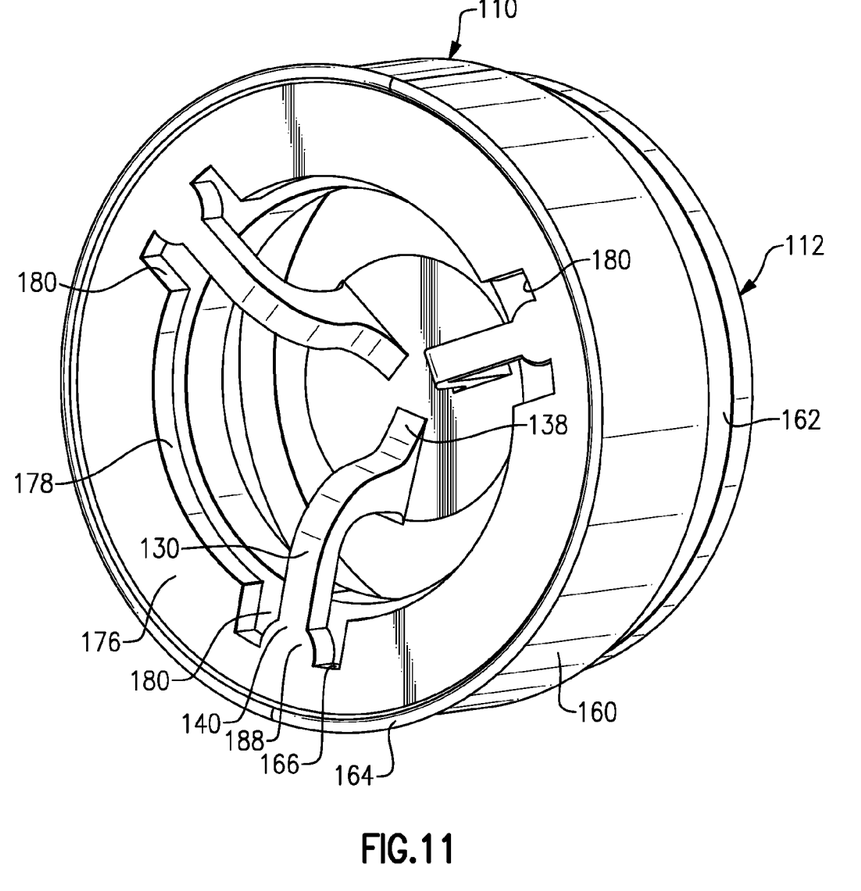
FIG. 11 is an end perspective showing the seat and diaphragm from the valve of FIG. 9.

FIGS. 9-11 disclose another example of an assembly 100 for limiting excess flow that includes a seat 110 and a diaphragm 112 that are coupled together and installed within a fitting 114.

The fitting 114 houses the excess flow valve and has an internal bore 116 defining a central axis A that extends from an upstream end 118 to a downstream end 120. The bore 116 provides a shoulder 122 to interact with the seat 110. The seat 110 is held fixed within the internal bore 116 and provides a sealing surface 126. The diaphragm 112 is coupled to the seat 110 by one or more legs 130. The diaphragm 112 is spaced apart from the sealing surface 126 during normal flow conditions and is in engagement with the sealing surface 126 when a predetermined flow condition is exceeded.

The diaphragm 112 comprises a ring portion 128 and a seal portion 132 that comprises a solid body having an upstream side 134 and a downstream side 136 (FIG. 10). The legs 130 have a first end 138 attached to the downstream side 136 and a second end 140 attached to the ring portion 128. The legs 130 are circumferentially spaced apart from each other about the central axis A. Gaps or openings 142 are formed between adjacent legs 130. The legs 130 are moveable between a first position during normal flow conditions and are collapsed to a second position when the predetermined flow condition is exceeded in a manner similar to that shown and described above.

In one example, the solid body of the seal portion 132 comprises a cup-shape with the upstream side 134 comprising a concave surface against which flow pressure F is exerted. A lip 144 extends about the central axis A to form a peripheral edge 146 of the seal portion 132. The seal portion 132 on the upstream side 134 curves inwardly from the lip 144 to a bottom 148 of the cup-shape. The peripheral edge 146 defines a maximum of an outermost diameter of the seal portion 132 while the bottom 148 defines a minimum diameter of the seal portion 132. The seal portion 132 includes a tapered surface portion 150 that extends inwardly from the downstream side of the lip 144 toward the bottom 148 at the minimum diameter.

As discussed above, the first ends 138 of the legs 130 are attached to a downstream side of the bottom 148 of the seal portion 132, and the legs 130 are curved in a radially inwardly direction during normal flow conditions as shown in FIGS. 9-10. The legs 130 are formed from a flexible material such that the legs 130 are capable of holding the seal portion 132 away from the seat 110 during normal flow conditions. During an excess flow condition, the resilient upstream biasing force of the legs 130 is overcome and the legs 130 bend further inwardly toward each other to pull the seal portion 132 in a downstream direction until the tapered surface portion 150 is in sealing engagement with the sealing surface 126. When pressures eventually equalize on both sides of the seal portion 132, the resilient force of the legs 130 allows the legs 130 to push the seal portion 132 in an upstream direction and out of engagement with the seat 110.

In one example, the seat 110 comprises a rigid ring or band 160 (FIG. 11) that has an upstream end face 162 and a downstream end face 164. The band 160 has central bore 166 that is aligned with the internal bore 116. The downstream end face 164 abuts directly against the shoulder 122 with the sealing surface 126 comprising a tapered surface 168 that extends in a radially inward direction from the upstream end face 162. The lip 144 of the seal portion 132 is seated against the upstream end face 162 during an excess flow condition.

The central bore 166 of the seat 110 defines a surface 170 that extends from a downstream end of the tapered surface 168 to the downstream end face 164. A groove or recess 172 is formed within the surface 170 to receive the ring portion 128 of the diaphragm 112.

The ring portion 128 fits within recess 172 such that an upstream surface 174 of the ring portion 128 abuts against an upper surface of the recess 172 to couple the seat 110 and diaphragm 112 together. A downstream surface 176 of the ring portion 128 faces the shoulder 122 of the fitting 114. As best shown in FIG. 11, the second ends 140 of the legs 130 are attached to an inner periphery 178 of the ring portion 128. The inner periphery 178 includes a plurality of removed sections 180, with one section 180 being associated with each second end 140 of one leg 130. In one example, the second ends 140 of the legs 130 include an enlarged portion 188 to increase the attachment strength of the legs 130 to the ring portion 128. The removed sections 180 further facilitate the collapsing movement of the seal portion 132 toward the sealing surface 126 of the seat 110.

In the example shown, the seat 110 is comprised of at least a first piece 190 and a second piece 192 that are fit together around the ring portion 128. The first and second pieces 190, 192 include an attachment interface to secure the pieces together once the ring portion is received within the recess 172. In one example, one of the pieces 190, 192 includes a male portion 194 while the other piece 190, 192 includes a female portion 196 that is snapped into the male portion 194 to form a snap-fit attachment interface. Other attachment methods and structures could also be used. With this split seat 110 configuration, it is easier to assemble than prior four piece designs as the two pieces can easily snap together around the flexible diaphragm 112.

Figure 12:
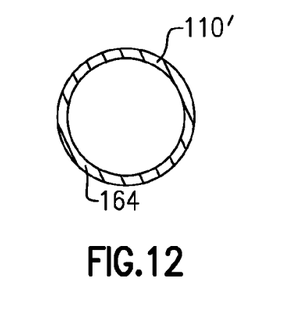
FIG. 12 is a cross-section view of a downstream end of a single piece seat.

Optionally, the seat 110' could be formed as a single-piece, unitary structure (FIG. 12). In this type of configuration, at least a portion of the diaphragm 112 is compressible such that one end of the diaphragm 112 can be inserted into the seat 110 for installation purposes and with the portion rebounding from compression once properly installed to form an assembly configured for receipt within the fitting 114.

During normal flow conditions fluid flows around the outermost peripheral edge 146 of the lip 144 of the diaphragm 112 and then flows through the openings 142 formed between adjacent legs 130. The fluid then flows through the central opening 166 of the band 160 to exit the downstream end 120 of the fitting 114. When the predetermined flow condition is exceeded, such as during an excess flow condition, the diaphragm 112 engages the tapered surface 168 to prevent flow through the central opening 166 of the band 160.

The subject invention offers several advantages over prior designs. The subject invention offers a reduction in components as compared to a four-piece configuration (eliminating a brass fitting, a brass seat, a plate and replacing a plastic housing, for example), resulting in a simpler design. This results in a quicker, easier, and more cost-effective assembly process.

In one example, a two-piece configuration is provided with the valve being co-molded or molded in during a two-shot molding process. The legs of the diaphragm have a smaller cross-sectional area as compared to the previous plastic housing, which allows for more efficient flow through the valve. Also, the diaphragm can be manufactured from an elastomer or thermoplastic material with similar properties, with a plastic or rigid base for stability during assembly.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

What is claimed is:

1. An assembly for limiting excess flow comprising:
a seat providing a sealing surface; and
a diaphragm coupled to the seat, the diaphragm including a seal portion and a plurality of legs extending between the seal portion and the seat, and wherein the seal portion is spaced apart from the sealing surface during a first flow condition and is in engagement with the sealing surface when a second flow condition is exceeded.

2. The assembly of claim 1 wherein the plurality of legs are circumferentially spaced apart from each other.

3. The assembly of claim 2 wherein the legs are moveable between a first position during normal flow conditions and wherein the legs are collapsed to a second position when the second flow condition is exceeded.

4. The assembly of claim 2 wherein the seal portion comprises a solid body having an upstream side and a downstream side, and wherein each leg has a first end attached to the downstream side and a second end directly attached to the seat.

5. The assembly of claim 2 wherein the seal portion comprises a solid body having an upstream side and a downstream side, and wherein the diaphragm further includes a ring portion axially spaced from the seal portion, and wherein each leg has a first end attached to the downstream side and a second end attached to the ring portion.

6. The assembly of claim 5 wherein the seat comprises a band having a central bore extending from an upstream end face to a downstream end face, and wherein the sealing surface comprises a tapered surface portion formed along at least a portion of the central bore.

7. The assembly of claim 6 wherein the seat comprises a single-piece structure, and wherein at least a portion of the diaphragm is compressible such that one end of the diaphragm can be inserted into the seat for installation purposes and with the portion rebounding from compression once installed to form an assembly configured for receipt within a fitting.

8. The assembly of claim 6 wherein the seat comprises first and second pieces that are fitted together around the ring portion to form an assembly configured for receipt within a fitting.

9. The assembly of claim 8 wherein one of the first and second pieces includes at least one female portion and the other of the first and second pieces includes at least one male portion configured to be received within the at least one female portion to secure the first and second pieces together.

10. The assembly of claim 1 wherein the first flow condition defines a first flow pressure and the second flow condition defines a second flow pressure that is greater than the first flow pressure.

11. An assembly for limiting excess flow comprising:
a fitting having an internal bore defined by a first diameter;
a seat positioned within the internal bore, the seat providing a sealing surface; and
a diaphragm coupled to the seat, the diaphragm including a seal portion and a plurality of legs extending between the seal portion and the seat, and wherein the seal portion is spaced apart from the sealing surface during a first flow condition and is in engagement with the sealing surface when a second flow condition is exceeded.

12. The assembly of claim 11 wherein the seal portion includes an outermost peripheral edge that defines a second diameter that is less than the first diameter, and wherein the seat defines an inner opening that includes a tapered surface that forms the sealing surface, and wherein during normal flow conditions fluid flows around the outermost peripheral edge of the seal portion and then through openings formed between the legs and then flows through an open downstream end of the seat, and when the second flow condition is exceeded the plurality of legs collapse and the seal portion engages the tapered surface to prevent flow through the inner opening of the seat.

13. The assembly of claim 11 wherein the fitting comprises a first piece having a first attachment interface and a second piece having a second attachment interface that cooperates with the first attachment interface to selectively connect the first and second pieces together to surround the seat and diaphragm.

14. The assembly of claim 11 wherein the seal portion comprises a cup-shape having an upstream side comprising a concave surface against which flow pressure is exerted, and wherein the legs are curved in a radially inwardly direction during the first flow condition.

15. The assembly of claim 11 wherein the seal portion comprises a solid body having an upstream side and a downstream side, and wherein the diaphragm further includes a ring portion axially spaced from the seal portion, and wherein each leg has a first end attached to the downstream side and a second end attached to the ring portion.

16. The assembly of claim 15 wherein the seat comprises a band held fixed within the fitting and having a central bore extending from an upstream end face to a downstream end face, and wherein the sealing surface comprises a tapered surface portion formed along at least a portion of the central bore.

17. The assembly of claim 16 wherein the seat comprises a single-piece structure that includes a recess formed within the downstream end face to receive the ring portion.

18. The assembly of claim 16 wherein the seat comprises first and second pieces that are fitted together around the ring portion to securely couple the diaphragm and seat together.

19. The assembly of claim 18 wherein one of the first and second pieces includes at least one female portion and the other of the first and second pieces includes at least one male portion configured to be received within the at least one female portion to secure the first and second pieces together.

20. The assembly of claim 11 wherein the first flow condition defines a first flow pressure and the second flow condition defines a second flow pressure that is greater than the first flow pressure.

21. A method of forming an excess flow valve comprising:
forming first and second fitting pieces;
connecting the first and second fitting pieces together to define an internal bore;
coupling a diaphragm having a seal portion and a plurality of legs to a seat such that the seal portion is moveable relative to the seat
fixing the seat within the internal bore.

22. The method of claim 21 including forming the diaphragm to include a ring portion that is coupled to the seal portion via the plurality of legs, and forming the seat as a band that is fit within the internal bore and which surrounds the ring portion.

* * * * *